(12) United States Patent
Yokouchi et al.

(10) Patent No.: US 10,070,014 B2
(45) Date of Patent: Sep. 4, 2018

(54) PRINT DATA PROCESSING METHOD AND APPARATUS REDUCING INK APPLIED IN EROSION REGION AMONG WHITE-PLATE DATA

(71) Applicant: SCREEN Holdings Co., Ltd., Kyoto (JP)

(72) Inventors: Kenichi Yokouchi, Kyoto (JP); Hiroyuki Segawa, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 15/654,635

(22) Filed: Jul. 19, 2017

(65) Prior Publication Data

US 2018/0025258 A1    Jan. 25, 2018

(30) Foreign Application Priority Data

Jul. 21, 2016   (JP) .................. 2016-143128

(51) Int. Cl.
*H04N 1/58*   (2006.01)
*H04N 1/60*   (2006.01)
(Continued)

(52) U.S. Cl.
CPC ............. *H04N 1/58* (2013.01); *G06K 15/023* (2013.01); *G06K 15/188* (2013.01);
(Continued)

(58) Field of Classification Search
CPC .......... H04N 1/00002; H04N 1/00005; H04N 1/00015; H04N 1/00023; H04N 1/00039; H04N 1/00082; H04N 1/00092; H04N 1/034; H04N 1/50–1/508; H04N 1/56; H04N 1/58; H04N 1/60; H04N 1/6027; H04N 1/603; H04N 1/6072; H04N 1/6097;
(Continued)

(56) References Cited

U.S. PATENT DOCUMENTS 5,481,662 A      1/1996   Kouyama et al.
5,581,667 A  *  12/1996   Bloomberg ............ G06K 15/02
                                                          358/1.9
(Continued)

FOREIGN PATENT DOCUMENTS

JP    H7-110568 A    4/1995

*Primary Examiner* — Scott A Rogers
(74) *Attorney, Agent, or Firm* — McDermott Will & Emery LLP

(57) ABSTRACT

A white-plate graphic erosion process is performed on print data subjected to a RIP process in the following procedure. First, an erosion candidate region which is a candidate for a region in which a white-plate graphic is eroded is determined. Then, a region to be applied with an ink of a color other than white is determined. Then, an application target region is determined. Then, a region other than a region obtained by an erosion process out of the application target region is determined to be an erosion allowed region. Then, a region included in the colored region and the erosion allowed region out of the erosion candidate region is determined to be an erosion target region. Finally, the values of data of pixels included in the erosion target region among white-plate data are rewritten such that the amount of white ink applied to the pixels is reduced.

8 Claims, 16 Drawing Sheets

(51) Int. Cl.
*G06K 15/02* (2006.01)
*G06T 5/30* (2006.01)
*H04N 1/034* (2006.01)
*G06K 15/10* (2006.01)
*B41J 2/21* (2006.01)

(52) U.S. Cl.
CPC ....... *G06K 15/189* (2013.01); *G06K 15/1825* (2013.01); *G06K 15/1871* (2013.01); *G06K 15/1877* (2013.01); *G06T 5/30* (2013.01); *H04N 1/60* (2013.01); *H04N 1/6072* (2013.01); *H04N 1/6097* (2013.01); *B41J 2/2132* (2013.01); *G06K 15/102* (2013.01); *H04N 1/034* (2013.01)

(58) Field of Classification Search
CPC .. G06K 15/023; G06K 15/027; G06K 15/102; G06K 15/1825; G06K 15/1826; G06K 15/1876; G06K 15/1871; G06K 15/1877; G06K 15/1878; G06K 15/188; G06K 15/189; G06K 9/44; G06T 5/30
See application file for complete search history.

(56) References Cited

U.S. PATENT DOCUMENTS

| | | | | |
|---|---|---|---|---|
| 6,361,144 B1* | 3/2002 | Torpey | ................ | G06K 15/102 347/15 |
| 6,809,839 B1* | 10/2004 | Earl | ........................ | H04N 1/58 358/1.9 |
| 7,751,084 B2* | 7/2010 | Segawa | .................... | H04N 1/58 358/1.18 |
| 7,775,618 B2* | 8/2010 | Shimakawa | ........... | B41J 2/2132 347/15 |
| 8,164,798 B2* | 4/2012 | Segawa | .................... | H04N 1/58 358/3.15 |
| 8,630,017 B2* | 1/2014 | Kanematsu | .......... | G06K 15/102 347/14 |
| 9,697,631 B2* | 7/2017 | Segawa | .................... | G06T 5/30 |
| 9,855,765 B2* | 1/2018 | Hayashida | ............. | B41J 2/2132 |
| 9,965,710 B2* | 5/2018 | Genda | ................... | G06K 15/189 |
| 2006/0028701 A1* | 2/2006 | Suzuki | .................... | H04N 1/58 358/518 |
| 2009/0080003 A1* | 3/2009 | Murakami | ............... | H04N 1/58 358/1.9 |

* cited by examiner

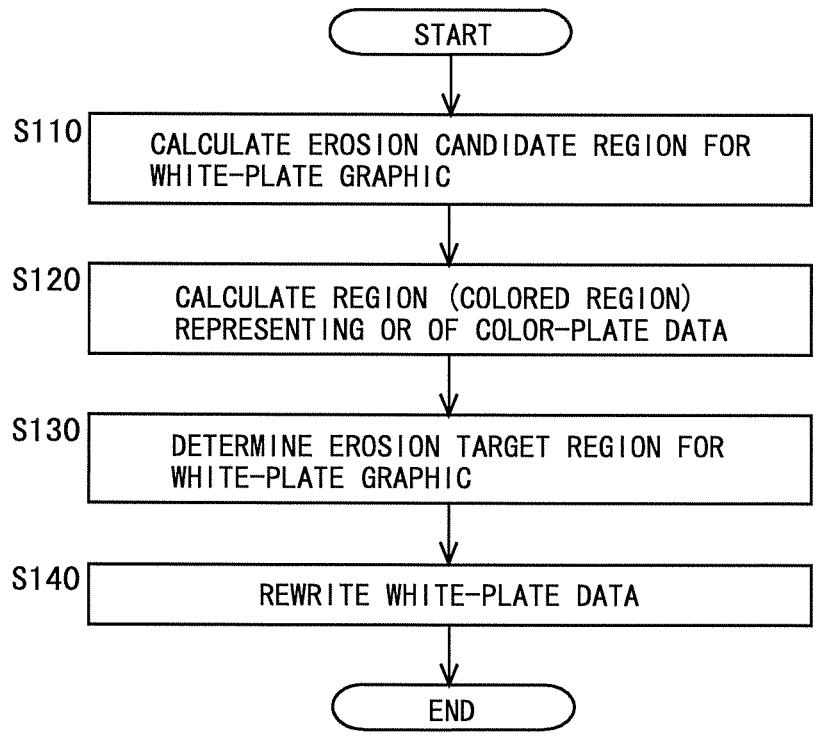
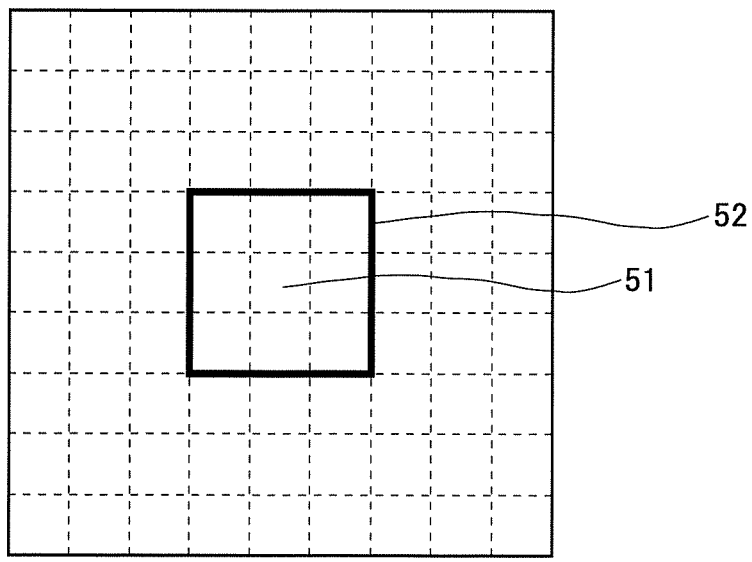

PRINT DATA PROCESSING METHOD AND APPARATUS REDUCING INK APPLIED IN EROSION REGION AMONG WHITE-PLATE DATA

BACKGROUND OF THE INVENTION

Field of the Invention

The present invention relates to a method for processing data for printing (print data processing method), and more specifically to a method for processing data of a white-plate graphic (a graphic corresponding to a region where a white ink is applied) in order to prevent a reduction in print quality in a printing system that performs printing using white (W) in addition to four colors (C, M, Y, and K) for process color.

Description of Background Art

In the plate-making and printing field, first, using a computer (e.g., a personal computer) called a front-end, an editing process is performed using a plurality of types of elements such as characters, logos, patterns, and illustrations that form printed matter, and page data in which a print target is described in a page description language, etc., is generated. The page data is converted, by a RIP process (rasterizing process), into image data in bitmap format that represents an image of the print target. Then, using the image data in bitmap format, a printing plate is produced by a plate-making apparatus. Thereafter, printing is performed by a printer using the printing plate, and printed matter is outputted.

Meanwhile, in recent years, there have been cases in which printing is performed on transparent base materials such as vinyl and cellophane. For example, printing is performed on a transparent base material and the printed transparent base material is attached to the side of a cylindrical can (see FIG. 31). In such a case, in a region where inks have not been applied upon printing, the color of the can itself appears as it is on a surface. When printing is thus performed on a transparent base material, if printing is performed in the same manner as when printing is performed on white printing paper, then desired colors are not reproduced. This is because the values (density) of data of respective plates (C, M, Y, and K plates) are adjusted to reproduce desired colors when printing is performed on white printing paper. Hence, when printing is performed on a transparent base material, conventionally, a technique is adopted in which a region of substantially the same shape as an image or a character to be printed is coated white in advance with a white ink, and process color inks are applied thereover again. In order to implement this, a white plate is used in addition to four color plates for process color. Note that in this specification, a graphic corresponding to a region where a white ink is applied using a white plate is referred to as a "white-plate graphic", and a graphic corresponding to a region where an ink of a desired color is applied using a color plate is referred to as a "color-plate graphic".

If misregistration (plate misregistration) occurs between a white plate and a color plate due to the extension of a base material, etc., when printing using a white plate such as that described above is performed, then white streaks appear around a graphic (the "graphic" used here is a concept including a shape representing a character). Hence, as disclosed in Japanese Laid-Open Patent Publication No. 7-110568, for example, a process of thinning a white-plate graphic to make the white-plate graphic smaller than a color-plate graphic is performed on vector data obtained before a RIP process. In this manner, the occurrence of white streaks around a graphic when misregistration occurs is suppressed.

Note that a process of changing the data values of pixels located at a periphery of a graphic to thin the overall graphic is called an "erosion process" in the image processing field. Hence, in this specification, a series of processes for thinning a white-plate graphic is referred to as a "white-plate graphic erosion process". The erosion process is typically performed on a binary image. For example, in a case in which the data value for white is "1" and the data value for black is "0", a pixel with a data value of 1 is set as a focused pixel, and if there is even one pixel with a data value of 0 around the focused pixel, then the data value of the focused pixel is rewritten from 1 to 0. In this manner, an overall white graphic is eroded. When an erosion process is performed on a multi-level image, the data value of a pixel determined to be an erosion target based on a predetermined rule is rewritten from its original value to, for example, 0.

Meanwhile, in recent years, plateless printing that does not use printing plates has been performed in various fields. One of the representative apparatuses that perform plateless printing is an inkjet printing apparatus. A common inkjet printing apparatus that performs color printing uses a white (W) ink in addition to inks of four colors (C, M, Y, and K) for process color. In such an inkjet printing apparatus, too, due to the misregistration of the discharge positions of respective color inks, etc., white streaks may appear around a graphic in the same manner as when the above-described plate misregistration occurs. Hence, when printing by an inkjet printing apparatus is performed, too, the above-described white-plate graphic erosion process may be performed. Note that in the following, for convenience of description, "misregistration" (misregistration of ink discharge positions, etc.) that causes the above-described white streaks in plateless printing is also referred to as "plate misregistration".

However, the above-described white-plate graphic erosion process needs to be performed taking into account an overlapping state or a proximity state between a plurality of graphics (vector data). Due to this, when data to be processed is composed of complex graphics, it takes a long time to perform a white-plate graphic erosion process, reducing the overall processing efficiency of printing. Particularly, when variable printing in which design, etc., vary from page to page is performed, the processing time significantly increases. In addition, if a white-plate graphic erosion process is made simple to reduce the processing time, then sufficient print quality may not be able to be ensured.

SUMMARY OF THE INVENTION

An object of the present invention is therefore to achieve an increase in the speed of a white-plate graphic erosion process while sufficient print quality is ensured.

In order to attain the above-described object, the present invention has features shown below.

One aspect of the present invention is directed to a method for processing print data, the print data being raster data including white-plate data representing a white-plate graphic corresponding to a region to be applied with a white ink; and color-plate data representing a color-plate graphic corresponding to a region to be applied with an ink of a color other than white, the method including:

an erosion candidate region calculating step of determining an erosion candidate region, the erosion candidate region being a candidate for a region in which the white-plate graphic represented by the white-plate data is eroded;

a colored-region calculating step of determining a colored region based on the color-plate data, the colored region being the region to be applied with an ink of a color other than white;

an application target region calculating step of determining, as an application target region, a region of a set of pixels included in at least one of the colored region and the region to be applied with a white ink based on the white-plate data;

an erosion allowed region calculating step of determining an erosion allowed region by performing an erosion process on the application target region, the erosion allowed region being a region allowing for erosion of the white-plate graphic represented by the white-plate data;

an erosion target region identifying step of defining a region of a set of pixels included in all of the erosion candidate region, the colored region, and the erosion allowed region as an erosion target region; and a white-plate data updating step of rewriting values of data of the pixels included in the erosion target region among the white-plate data such that an amount of white ink applied to the pixels is reduced.

According to such a configuration, as for a process for print data when printing using a white ink is performed, a process of eroding a white-plate graphic (white-plate graphic erosion process) is performed not on vector data but on raster data. Hence, upon a white-plate graphic erosion process, there is no need to take into account an overlapping state or a proximity state between a plurality of graphics (vector data). By this, a white-plate graphic erosion process can be performed at a high speed. In addition, a pixel in which process color inks are not applied over a white ink does not serve as an erosion target. Hence, a part or all of a white graphic (e.g., a white character or a white thin line) represented by white-plate data is prevented from disappearing or getting thinner. In addition, as for an outline character formed using white-plate data, a character portion is prevented from getting thicker. Furthermore, when an overlapping portion that takes into account plate misregistration between a white plate and a color plate is provided, pixels included in the overlapping portion do not serve as erosion targets. Hence, a reduction in print quality due to plate misregistration is suppressed. As described above, even when print data includes various data as white-plate data, an increase in the speed of a white-plate graphic erosion process is achieved while sufficient print quality is ensured.

Another aspect of the present invention is directed to a method for processing print data, the print data being raster data including white-plate data representing a white-plate graphic corresponding to a region to be applied with a white ink; and color-plate data representing a color-plate graphic corresponding to a region to be applied with an ink of a color other than white, the method including:

an erosion candidate region calculating step of determining an erosion candidate region, the erosion candidate region being a candidate for a region in which the white-plate graphic represented by the white-plate data is eroded;

a colored-region calculating step of determining a colored region based on the color-plate data, the colored region being the region to be applied with an ink of a color other than white;

an erosion target region identifying step of defining a region of a set of pixels included in both the erosion candidate region and the colored region as an erosion target region; and a white-plate data updating step of rewriting values of data of the pixels included in the erosion target region among the white-plate data such that an amount of white ink applied to the pixels is reduced.

According to such a configuration, as for a process for print data when printing using a white ink is performed, a process of eroding a white-plate graphic (white-plate graphic erosion process) is performed not on vector data but on raster data. Hence, upon a white-plate graphic erosion process, there is no need to take into account an overlapping state or a proximity state between a plurality of graphics (vector data). By this, a white-plate graphic erosion process can be performed at a high speed. In addition, instead of performing a simple erosion process on a white-plate graphic, among pixels included in an erosion candidate region serving as a candidate for a white-graphic erosion target, only pixels that are included in a region having a color-plate graphic are determined to be erosion targets. In other words, pixels in which process color inks are not applied over a white ink do not serve as erosion targets. Hence, a part or all of a white graphic (e.g., a white character or a white thin line) represented by white-plate data is prevented from disappearing or getting thinner. In addition, as for an outline character formed using white-plate data, a character portion is prevented from getting thicker. As described above, an increase in the speed of a white-plate graphic erosion process is achieved while sufficient print quality is ensured.

A still another aspect of the present invention is directed to a print data processing apparatus that processes print data, the print data being raster data including white-plate data representing a white-plate graphic corresponding to a region to be applied with a white ink; and color-plate data representing a color-plate graphic corresponding to a region to be applied with an ink of a color other than white, the apparatus including:

an erosion candidate region calculating unit configured to determine an erosion candidate region, the erosion candidate region being a candidate for a region in which the white-plate graphic represented by the white-plate data is eroded;

a colored-region calculating unit configured to determine a colored region based on the color-plate data, the colored region being the region to be applied with an ink of a color other than white;

an application target region calculating unit configured to determine, as an application target region, a region of a set of pixels included in at least one of the colored region and the region to be applied with a white ink based on the white-plate data;

an erosion allowed region calculating unit configured to determine an erosion allowed region by performing an erosion process on the application target region, the erosion allowed region being a region allowing for erosion of the white-plate graphic represented by the white-plate data;

an erosion target region identifying unit configured to define a region of a set of pixels included in all of the erosion candidate region, the colored region, and the erosion allowed region as an erosion target region; and a white-plate data updating unit configured to rewrite values of data of the pixels included in the erosion target region among the white-plate data such that an amount of white ink applied to the pixels is reduced.

These and other objects, features, modes, and effects of the present invention will be made clear from the following detailed description of the present invention with reference to the accompanying drawings.

BRIEF DESCRIPTION OF THE DRAWINGS

FIG. 7 is a flowchart showing a procedure of a white-plate graphic erosion process in the first embodiment.

FIG. 8 is a diagram for describing an erosion process using a 3×3 erosion filter in the first embodiment.

DESCRIPTION OF PREFERRED EMBODIMENTS

Embodiments of the present invention will be described below with reference to the accompanying drawings. Note that although, in the following embodiments, description is made using a printing system that performs plateless printing, since the above-described white plate graphic erosion process is performed in the same manner as a printing system that performs plate printing, the term "plate" (a "white-plate graphic", "white-plate data", etc.) is used, for convenience of description.

1. First Embodiment

<1.1 Overall Configuration of a System>

Figure 1:
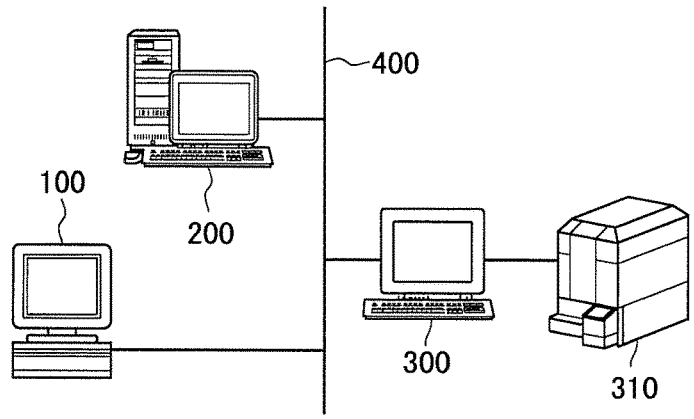
FIG. 1 is an overall configuration diagram of a printing system including a print data processing apparatus according to a first embodiment of the present invention.

FIG. 1 is an overall configuration diagram of a printing system including a print data processing apparatus 200 according to a first embodiment of the present invention. The printing system includes a client computer 100 for performing an editing process using a plurality of types of elements such as characters, logos, patterns, and illustrations that form printed matter; the print data processing apparatus 200 that performs data processing, such as a RIP process (rasterizing process), on submitted data; an inkjet printing apparatus 310 that performs color printing; and a print control apparatus 300 that controls the operation of the inkjet printing apparatus 310. The client computer 100, the print data processing apparatus 200, and the print control apparatus 300 are connected to each other by a communication line 400 so that they can communicate with each other. Note that in many cases a management computer, etc., are provided in addition to the above-described components, but since they are not particularly related to the present invention, description thereof is omitted.

Printing by the printing system is roughly performed as follows. First, in the client computer 100, for example, page data in which a print target is described in a page description language is generated by performing editing and layout of various types of elements. The page data generated by the client computer 100 is provided, as submitted data, to the print data processing apparatus 200. The print data processing apparatus 200 performs data processing, such as a RIP process, on the submitted data. By this, print data (image data) in bitmap format is generated. In addition, the print data processing apparatus 200 performs a white-plate graphic erosion process on the print data in bitmap format. The print data subjected to the white-plate graphic erosion process is sent to the print control apparatus 300. Then, by the print control apparatus 300 instructing the inkjet printing apparatus 310 to perform printing, printing based on the print data is performed. As such, in the present embodiment, a white-plate graphic erosion process is performed by the print data processing apparatus 200, but may be performed by the print control apparatus 300.

Note that in the present embodiment, upon printing, a white (W) ink is used in addition to inks of four colors (C, M, Y, and K) for process color. Therefore, the above-described print data includes four color-plate data (C-plate data, M-plate data, Y-plate data, and K-plate data) and white-plate data.

<1.2 Configuration of the Print Data Processing Apparatus>

Figure 2:
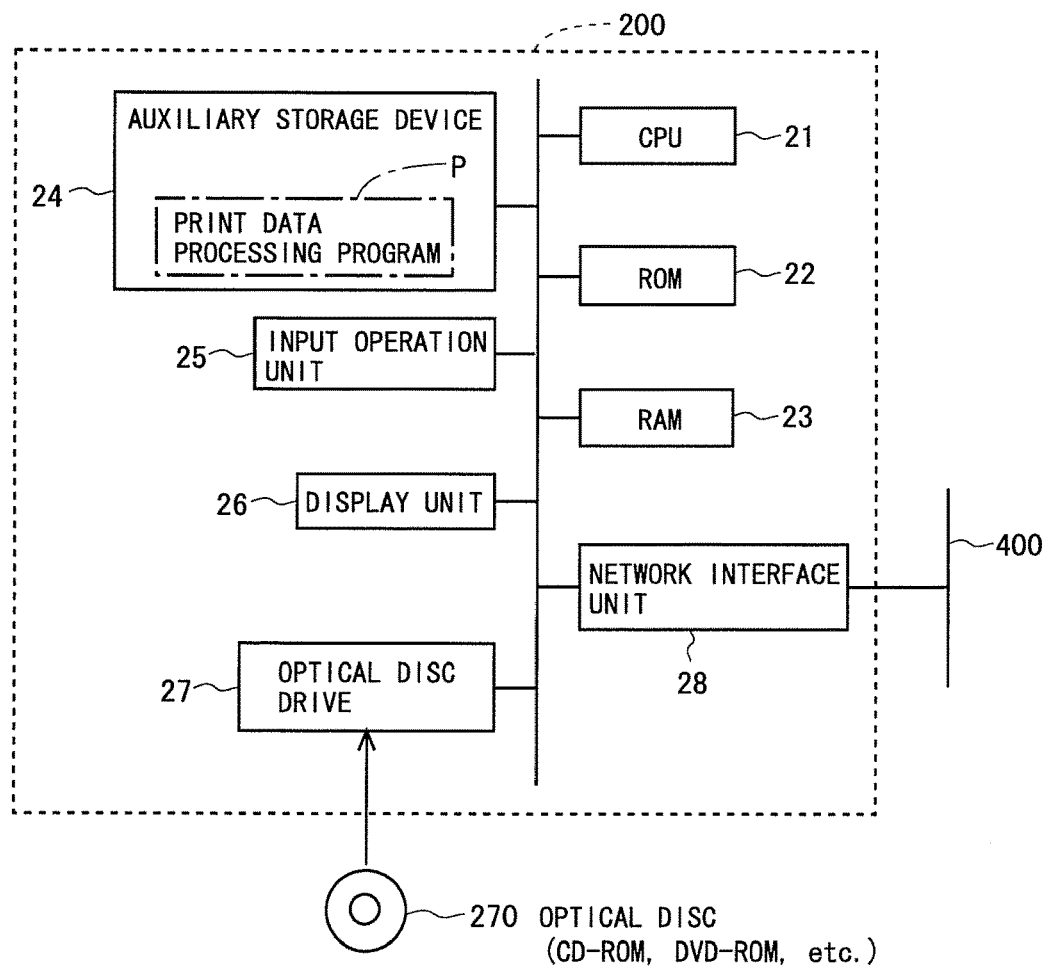
FIG. 2 is a hardware configuration diagram of the print data processing apparatus in the first embodiment.

FIG. 2 is a hardware configuration diagram of the print data processing apparatus 200 in the present embodiment. The print data processing apparatus 200 is implemented by a personal computer, and includes a CPU 21, a ROM 22, a RAM 23, an auxiliary storage device 24, an input operation unit 25 such as a keyboard, a display unit 26, an optical disc drive 27, and a network interface unit 28. Submitted data (page data) which is sent from the client computer 100 via the communication line 400 is inputted into the print data processing apparatus 200 through the network interface unit 28. Print data generated by the print data processing apparatus 200 based on the submitted data is sent through the network interface unit 28 to the print control apparatus 300 via the communication line 400.

A program for performing a white-plate graphic erosion process (hereinafter, referred to as a "print data processing program") P is stored in the auxiliary storage device 24. When an instruction to perform a white-plate graphic erosion process is provided in the print data processing apparatus 200, the print data processing program P is read into the RAM 23, and the CPU 21 executes the print data processing program P read into the RAM 23, by which a white-plate graphic erosion process is performed. Note that a white-plate graphic erosion process may be performed after a RIP process without through a user operation. The print data processing program P is provided stored in a computer-readable recording medium such as a CD-ROM or a DVD-ROM. That is, a user, for example, purchases an optical disc (a CD-ROM, a DVD-ROM, etc.) 270 serving as a recording medium for the print data processing program P, and places the optical disc 270 in the optical disc drive 27, by which the print data processing program P is read from the optical disc 270 and installed on the auxiliary storage apparatus 24. Alternatively, instead, the print data processing program P that is sent through the communication line 400 may be received by the network interface unit 28 and installed on the auxiliary storage device 24.

Note that the client computer 100 is also implemented by a personal computer as with the print data processing apparatus 200. Thus, description of a configuration of the client computer 100 is omitted.

<1.3 White-Plate Graphic Erosion Process>

A white-plate graphic erosion process (a series of processes for thinning a white-plate graphic) of the present embodiment will be described below.

<1.3.1 Overview>

Conventionally, a white-plate graphic erosion process is performed before performing a RIP process. That is, conventionally, a white-plate graphic erosion process is performed on vector data. In the present embodiment, on the other hand, a white-plate graphic erosion process is performed on data subjected to a RIP process, i.e., raster data.

Figure 3:
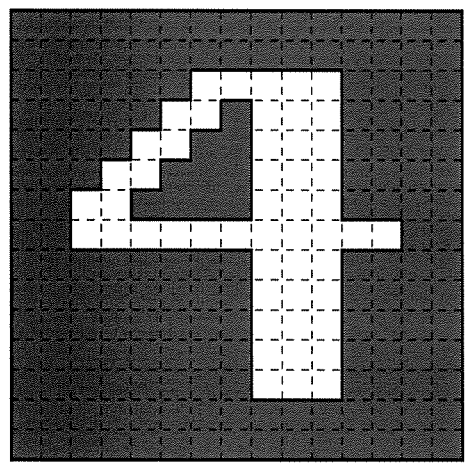
FIG. 3 is a diagram showing an example of a white character.

Regarding this, if an erosion process is simply performed on a white-plate graphic subjected to a RIP process (if a contour portion of a white-plate graphic is eroded by, for example, one pixel without taking into account a relationship between the white-plate graphic and color-plate graphics), a part or all of a character or a thin line which are corresponding to the white-plate graphic may disappear or get thinner. For example, when there is a white character such as that shown in FIG. 3 (a white portion indicates a region where a white ink is to be applied), the shape of the white character results in a shape such as that shown in FIG. 4 by an erosion process. Note that FIG. 3 shows a part of the entire image of a print target, and one block surrounded by a dotted line in FIG. 3 represents one pixel, which also applies to FIG. 4, etc.

In addition, there is a case in which a so-called "outline character" is formed using a white plate. If, in such a case, an erosion process is simply performed on a white-plate graphic, then a character portion gets thicker. For example, when there is an outline character such as that shown in FIG. 5 (a white portion indicates a region where a white ink is to be applied), the shape of the outline character results in a shape such as that shown in FIG. 6 by an erosion process.

As described above, when an erosion process is simply performed on a white-plate graphic subjected to a RIP process, a sufficient-quality printing result cannot be obtained. Hence, in the present embodiment, a process of thinning a white-plate graphic is performed taking into account whether an ink of a color other than white is applied over a white ink. A procedure of a white-plate graphic erosion process in the present embodiment will be described below. Note that in the following description it is assumed that for data of each plate, a pixel that is not to be applied with an ink of a corresponding color has a data value of 0, and a pixel to be applied with an ink of the corresponding color has a data value (a value other than 0) according to a tone. For example, as for white-plate data, a pixel with a data value other than 0 is applied with a white ink of an amount according to the data value, and a pixel with a data value of 0 is not applied with a white ink. In addition, for example, as for C-plate data, a pixel with a data value other than 0 is applied with a cyan ink of an amount according to the data value, and a pixel with a data value of 0 is not applied with a cyan ink.

<1.3.2 Processing Procedure>

FIG. 7 is a flowchart showing a procedure of a white-plate graphic erosion process in the present embodiment. Note that it is assumed that before performing this white-plate graphic erosion process, a RIP process is performed in advance on page data generated by an editing process using the client computer 100. That is, before performing this white-plate graphic erosion process, print data which is raster data is obtained by a RIP process. As described above, the print data includes white-plate data and color-plate data (C-plate data, M-plate data, Y-plate data, and K-plate data).

After the white-plate graphic erosion process starts, first, based on the white-plate data out of the print data obtained by a RIP process, a region (hereinafter, referred to as an "erosion candidate region") which is a candidate for an erosion target region (pixels that are not to be applied with a white ink) out of a region that forms a white-plate graphic is determined (step S110). At this step S110, the erosion candidate region is determined by an erosion process in which a 3×3 erosion filter is applied to each pixel. For example, it is assumed that, for the white-plate data, a pixel indicated by reference sign 51 in FIG. 8 (hereinafter, referred to as a "focused pixel") has a data value other than 0. At this time, when the smallest data value of nine pixels (pixels within a bold frame indicated by reference sign 52) with the focused pixel 51 being at the center is 0 (i.e., when there is even one pixel with a data value of 0 among the nine pixels), the data value of the focused pixel 51 after the erosion process is changed to 0. By performing such a process on the entire white-plate data, a set of pixels whose data values are rewritten from a value other than 0 to 0 serves as an erosion candidate region. In other words, a region other than a region obtained after erosion by the erosion process out of a region (a region forming a white-plate graphic based on the white-plate data) obtained before erosion by the erosion process serves as an erosion candidate region.

Then, based on the color-plate data out of the print data obtained by a RIP process, a region representing an OR of color-plate graphics (hereinafter, referred to as a "colored region" for convenience sake) is determined (step S120). At this step S120, the data value "0" is assigned the logical value "0", and the data value other than "0" is assigned the logical value "1". Then, a pixel in which at least one color-plate data has a logical value of 1 is allowed to be included in the colored region, and a pixel in which all color-plate data have a logical value of 0 is not allowed to be included in the colored region. In the above-described manner, the colored region which is a region to be applied with an ink (s) of a color (s) other than white is determined.

Then, a final erosion target region for the white-plate graphic is determined (step S130). Specifically, a region representing an AND between the erosion candidate region determined at step S110 and the colored region determined at step S120 (i.e., a region of a set of pixels included in both the erosion candidate region and the colored region) is defined as a final erosion target region.

Finally, a process of rewriting the white-plate data is performed on the print data obtained by a RIP process (step S140). Specifically, the values of data of the pixels included in the final erosion target region among the white-plate data are rewritten to 0.

Note that in the present embodiment, an erosion candidate region calculating step is implemented by step S110, a colored-region calculating step is implemented by step S120, an erosion target region identifying step is implemented by step S130, and a white-plate data updating step is implemented by step S140. What processes are to be performed on various white-plate graphics will be described below using specific examples.

<1.3.2.1 Process for a Normal Graphic>

Figure 9:
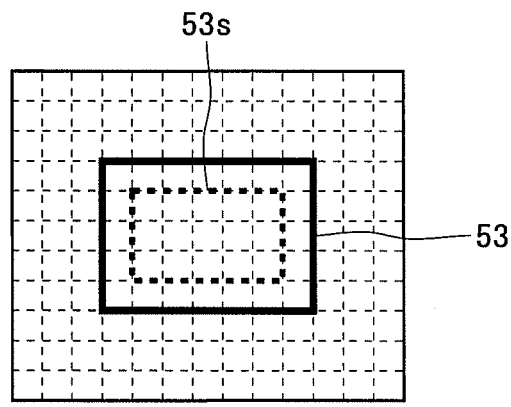
FIG. 9 is a diagram for describing a process for a normal graphic in the first embodiment.

First, what process is to be performed on a normal graphic will be described. The "normal graphic" as used here refers to a graphic in which the shapes of color-plate graphics and the shape of a white-plate graphic completely match each other regarding print data (raster data) obtained immediately after a RIP process. Such a graphic is typically generated in a case where a white ink is applied as a base ink when printing is performed on a transparent base material. Here, a case in which both a K-plate graphic and a white-plate graphic are a rectangular graphic indicated by reference sign 53 in FIG. 9 is focused on. Note that it is assumed that, as for color-plate data other than K-plate data, all pixels have a data value of 0.

Figure 10:
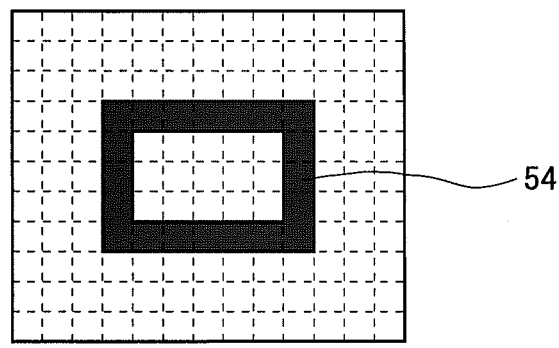
FIG. 10 is a diagram for describing the process for a normal graphic in the first embodiment.
Figure 11:
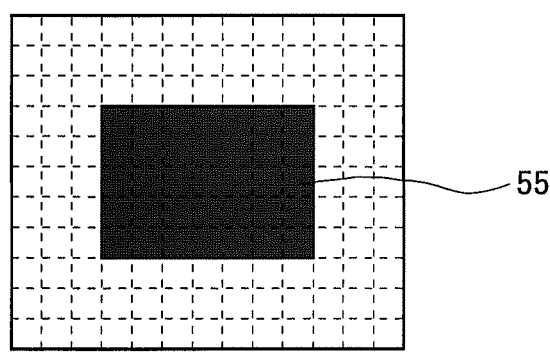
FIG. 11 is a diagram for describing the process for a normal graphic in the first embodiment.

At the above-described step S110, the above-described 3×3 erosion filter is applied to each pixel included in the rectangular graphic 53. As for white-plate data, pixels included in the rectangular graphic 53 have a data value other than 0, and pixels not included in the rectangular graphic 53 have a data value of 0. Therefore, by the erosion process, a region represented by a rectangular graphic 53s (see FIG. 9) is obtained. As described above, since a region other than a region (here, the region represented by the rectangular graphic 53s) obtained after erosion by an erosion process out of a region (here, the region represented by the rectangular graphic 53) obtained before erosion by the erosion process serves as an erosion candidate region, a shaded region indicated by reference sign 54 in FIG. 10 is determined to be an erosion candidate region. At the above-described step S120, based on the K-plate data, a region represented by the rectangular graphic 53, i.e., a shaded region indicated by reference sign 55 in FIG. 11, is determined to be a colored region. A final erosion target region is a region representing an AND between an erosion candidate region and a colored region. Since the erosion candidate region is the shaded region 54 in FIG. 10 and the colored region is the shaded region 55 in FIG. 11, the final erosion target region is the shaded region 54 in FIG. 10.

By the above, upon printing, a white ink is not applied to pixels in the shaded region 54 in FIG. 10 among pixels forming the white-plate graphic (pixels included in the rectangular graphic 53 in FIG. 9). By this, even when plate misregistration occurs between a white plate and a K plate, since a desired erosion process has been performed on the white-plate graphic, white streaks are suppressed from appearing around the black rectangular graphic formed based on the K-plate data.

<1.3.2.2 Process for a White Character>

Next, what process is to be performed on a white character will be described. Here, the white character shown in FIG. 3 is focused on. Note that it is assumed that, as for all color-plate data, all pixels have a data value of 0.

Figure 4:
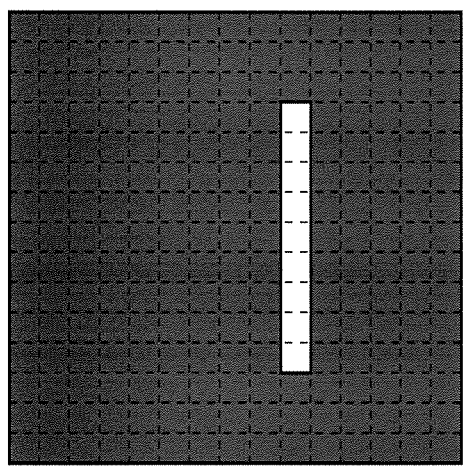
FIG. 4 is a diagram for describing that a part of the white character disappears by an erosion process.
Figure 12:
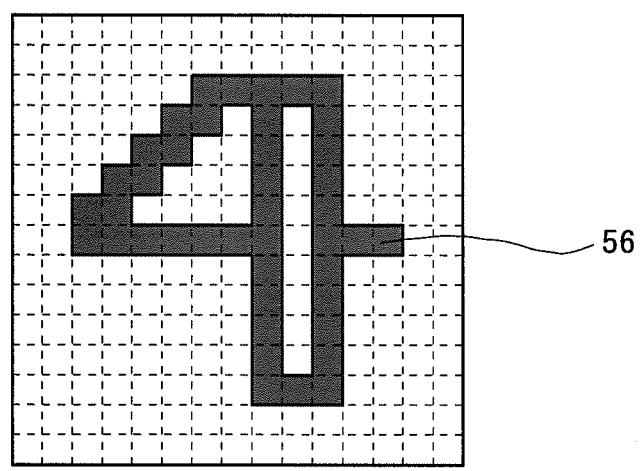
FIG. 12 is a diagram for describing a process for a white character in the first embodiment.

At the above-described step S110, the above-described 3×3 erosion filter is applied to each pixel represented by white in FIG. 3. As for white-plate data, the pixels represented by white in FIG. 3 have a data value other than 0, and pixels in a region shaded in FIG. 3 have a data value of 0. Therefore, by the erosion process, a region represented by white in FIG. 4 is obtained. As described above, since a region other than a region (here, the region represented by white in FIG. 4) obtained after erosion by an erosion process out of a region (here, the region represented by white in FIG. 3) obtained before erosion by the erosion process serves as an erosion candidate region, a shaded region indicated by reference sign 56 in FIG. 12 is determined to be an erosion candidate region. Since all pixels have a data value of 0 regarding all color-plate data, there is no region (pixels) to be determined to be a colored region at the above-described step S120. A final erosion target region is a region representing an AND between an erosion candidate region and a colored region. Since the erosion candidate region is the shaded region 56 in FIG. 12 and there is no region determined to be a colored region, there is no final erosion target region.

By the above, erosion is not performed on the white character shown in FIG. 3. Therefore, the white character is printed at a desired thickness.

<1.3.2.3 Process for an Outline Character>

Figure 5:
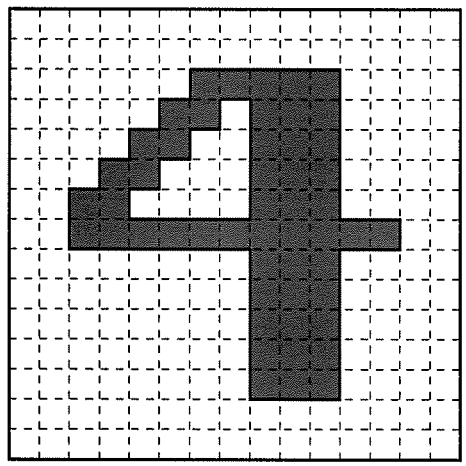
FIG. 5 is a diagram showing an example of an outline character.

Next, what process is to be performed on an outline character will be described. Here, the outline character shown in FIG. 5 is focused on. Note that it is assumed that, as for all color-plate data, all pixels have a data value of 0.

Figure 6:
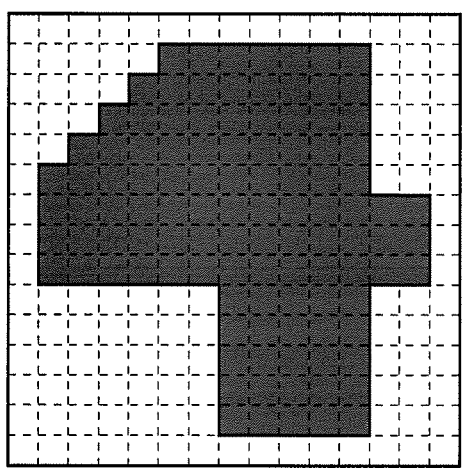
FIG. 6 is a diagram for describing that the outline character gets thicker by an erosion process.
Figure 13:
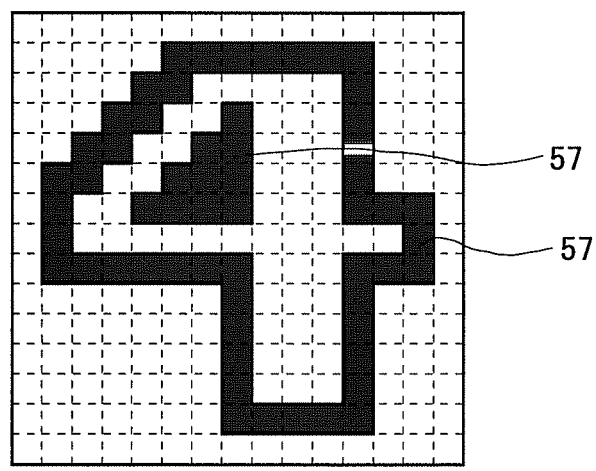
FIG. 13 is a diagram for describing the process for an outline character in the first embodiment.

At the above-described step S110, the above-described 3×3 erosion filter is applied to each pixel represented by white in FIG. 5. As for white-plate data, the pixels represented by white in FIG. 5 have a data value other than 0, and pixels in a region shaded in FIG. 5 have a data value of 0. Therefore, by the erosion process, a region represented by white in FIG. 6 is obtained. As described above, since a region other than a region (here, the region represented by white in FIG. 6) obtained after erosion by an erosion process out of a region (here, the region represented by white in FIG. 5) obtained before erosion by the erosion process serves as an erosion candidate region, shaded regions indicated by reference sign 57 in FIG. 13 are determined to be erosion candidate regions. Since all pixels have a data value of 0 regarding all color-plate data, there is no region (pixels) to be determined to be a colored region at the above-described step S120. A final erosion target region is a region representing an AND between an erosion candidate region and a colored region. Since the erosion candidate regions are the shaded regions 57 in FIG. 13 and there is no region determined to be a colored region, there is no final erosion target region.

By the above, erosion is not performed on the outline character shown in FIG. 5. Therefore, the outline character is printed at a desired thickness.

<1.3.2.4 Process for a Case in which a Normal Graphic and a White Character are Mixed>

Figure 14:
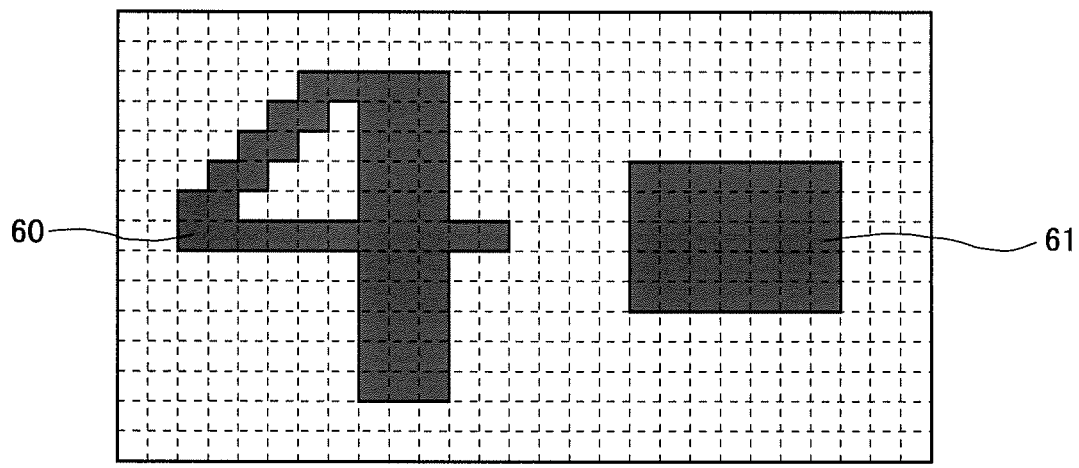
FIG. 14 is a diagram for describing a process for a case in which a normal graphic and a white character are mixed in the first embodiment.

Next, what process is to be performed for a case in which a normal graphic and a white character are mixed will be described. Here, a case shown in FIG. 14 is focused on. As for white-plate data, pixels included in shaded regions indicated by reference signs 60 and 61 in FIG. 14 have a data value other than 0, and other pixels have a data value of 0. As for K-plate data, pixels included in the shaded region indicated by reference sign 61 in FIG. 14 have a data value other than 0, and other pixels have a data value of 0. Note that it is assumed that, as for color-plate data other than the K-plate data, all pixels have a data value of 0.

Figure 15:
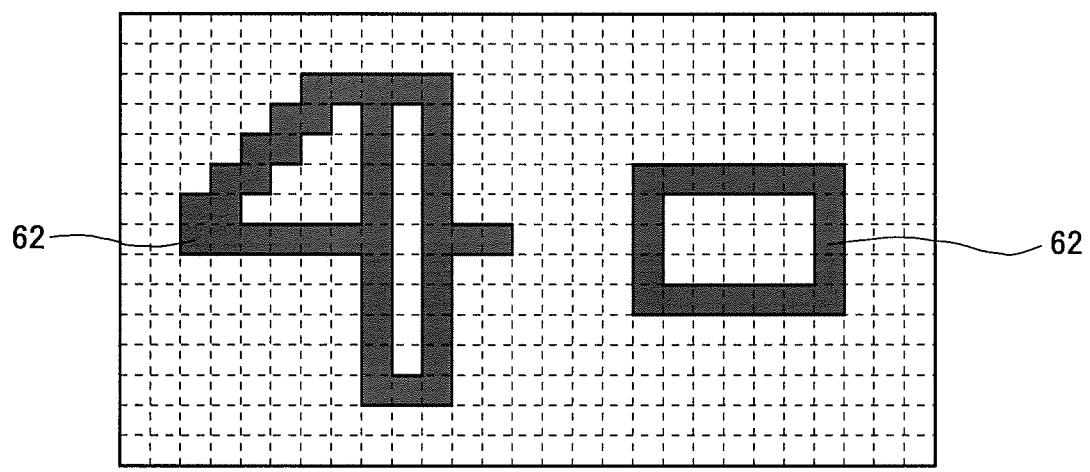
FIG. 15 is a diagram for describing the process for a case in which a normal graphic and a white character are mixed in the first embodiment.
Figure 16:
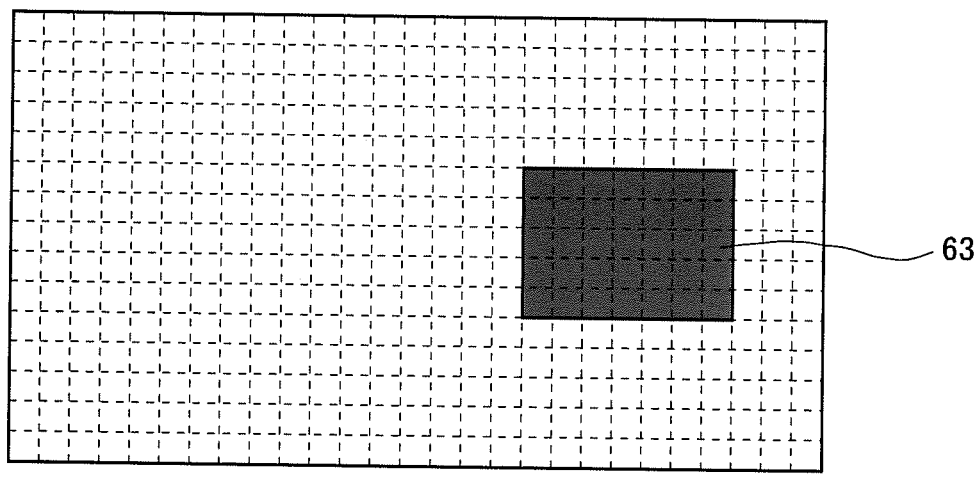
FIG. 16 is a diagram for describing the process for a case in which a normal graphic and a white character are mixed in the first embodiment.

At the above-described step S110, the above-described 3×3 erosion filter is applied to each pixel included in the shaded regions 60 and 61 in FIG. 14. As for the white-plate data, since the pixels included in the shaded regions 60 and 61 in FIG. 14 have a data value other than 0 and other pixels have a data value of 0, shaded regions indicated by reference sign 62 in FIG. 15 are determined to be erosion candidate regions. At the above-described step S120, based on the K-plate data, a shaded region indicated by reference sign 63 in FIG. 16 is determined to be a colored region. A final erosion target region is a region representing an AND between an erosion candidate region and a colored region. Since the erosion candidate regions are the shaded regions 62 in FIG. 15 and the colored region is the shaded region 63 in FIG. 16, the final erosion target region is a shaded region indicated by reference sign 64 in FIG. 17.

Figure 17:
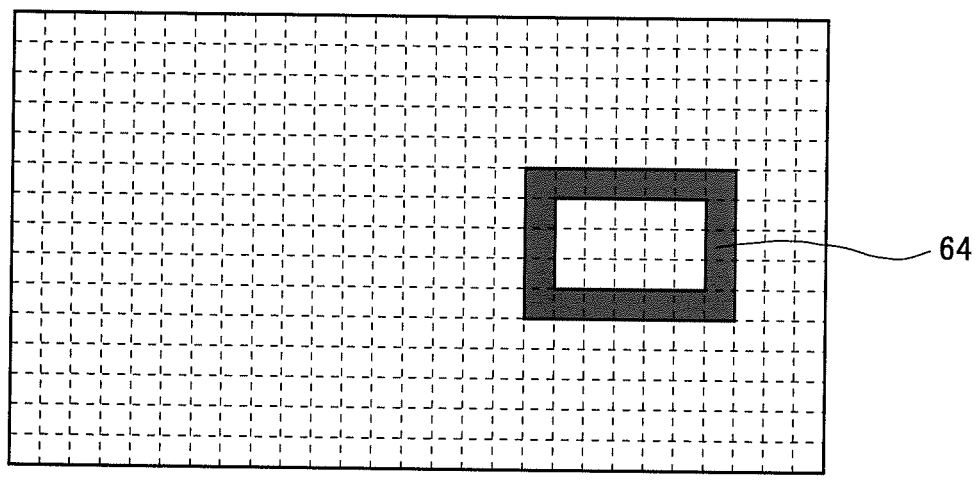
FIG. 17 is a diagram for describing the process for a case in which a normal graphic and a white character are mixed in the first embodiment.

By the above, as for the pixels forming the white-plate graphic (the pixels included in the shaded regions 60 and 61 in FIG. 14), a white ink is not applied to pixels in the shaded region 64 in FIG. 17 upon printing, and a white ink is applied to other pixels upon printing. By this, even when plate misregistration occurs between a white plate and a K plate, since a desired erosion process has been performed on the white-plate graphic, white streaks are suppressed from appearing around the black rectangular graphic formed based on the K-plate data. In addition, since erosion is not performed on the white character, the white character is printed at a desired thickness.

Likewise, when a normal graphic, a white character, and an outline character are mixed as appropriate, too, a desired erosion process is performed on a white-plate graphic forming the normal graphic, and an erosion process is not performed on the white character and the outline character.

<1.4 Effects>

According to the present embodiment, in the printing system that performs printing using a white ink in addition to inks for process color, a white-plate graphic erosion process (a process of thinning a white-plate graphic in order to ensure sufficient print quality) is performed not on vector data but on raster data. Hence, upon a white-plate graphic erosion process, there is no need to take into account an overlapping state or a proximity state between a plurality of graphics (vector data). By this, a white-plate graphic erosion process can be performed at a high speed. In addition, in the white-plate graphic erosion process in the present embodiment, instead of performing a simple erosion process on a white-plate graphic, among pixels included in a region (the above-described erosion candidate region) that is determined to be a candidate for an erosion target based on a white-plate graphic, only pixels that are included in a region having a color-plate graphic are determined to be erosion targets. In other words, pixels in which process color inks are not applied over a white ink do not serve as erosion targets. Hence, a part or all of a white graphic (e.g., a white character or a white thin line) formed using white-plate data is prevented from disappearing or getting thinner. In addition, as for an outline character formed using white-plate data, a character portion is prevented from getting thicker. As described above, according to the present embodiment, an increase in the speed of a white-plate graphic erosion process is achieved while sufficient print quality is ensured.

Figure 18:
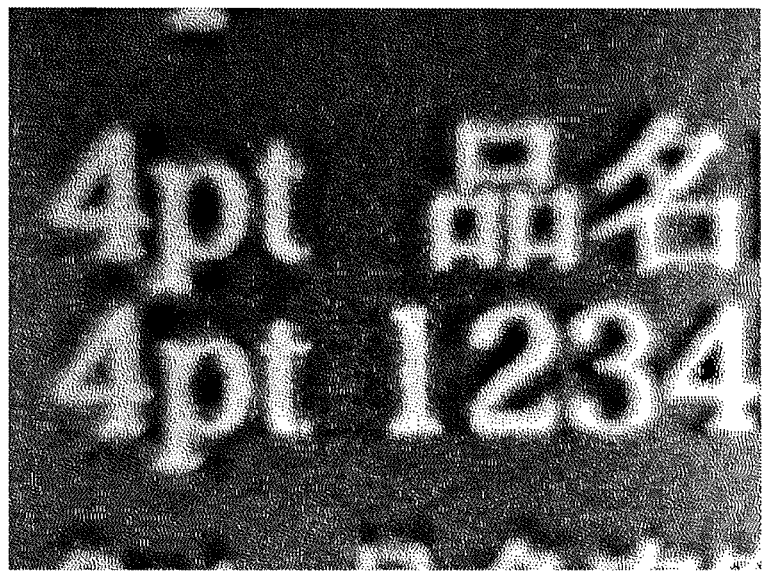
FIG. 18 is a diagram for describing an effect in the first embodiment.
Figure 19:
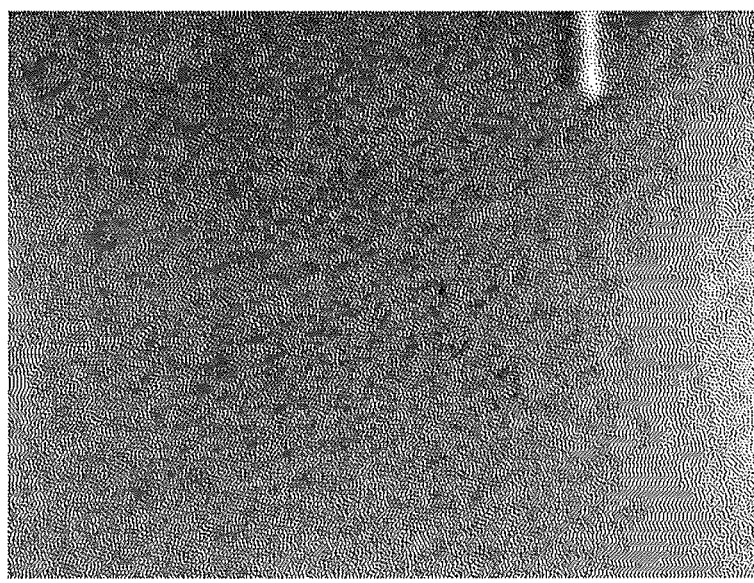
FIG. 19 is a diagram for describing an effect in the first embodiment.
Figure 20:
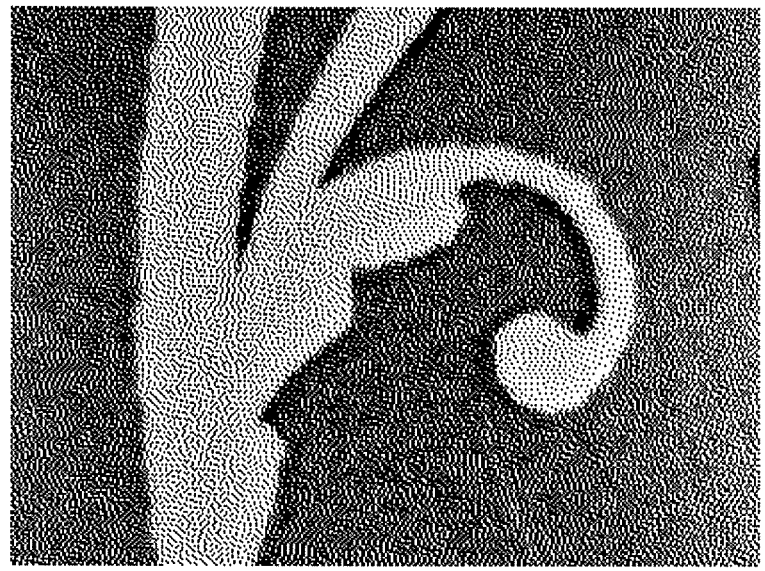
FIG. 20 is a diagram for describing an effect in the first embodiment.
Figure 21:
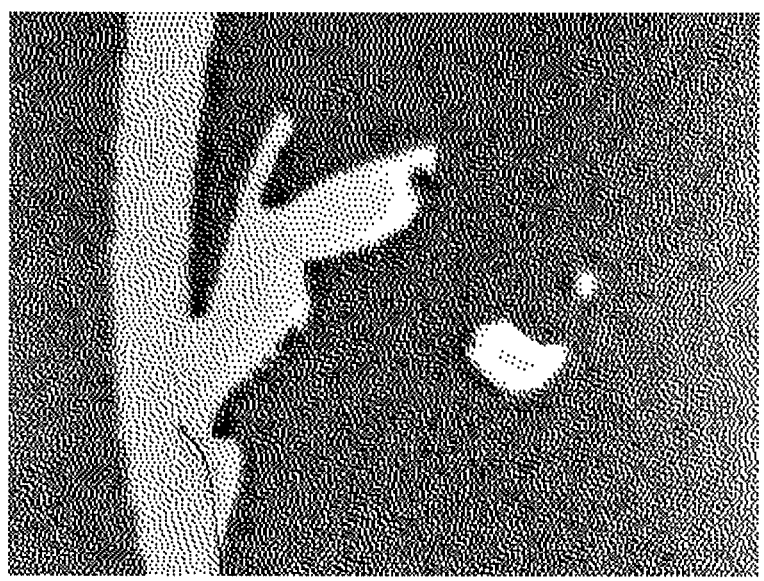
FIG. 21 is a diagram for describing an effect in the first embodiment.
Figure 22:
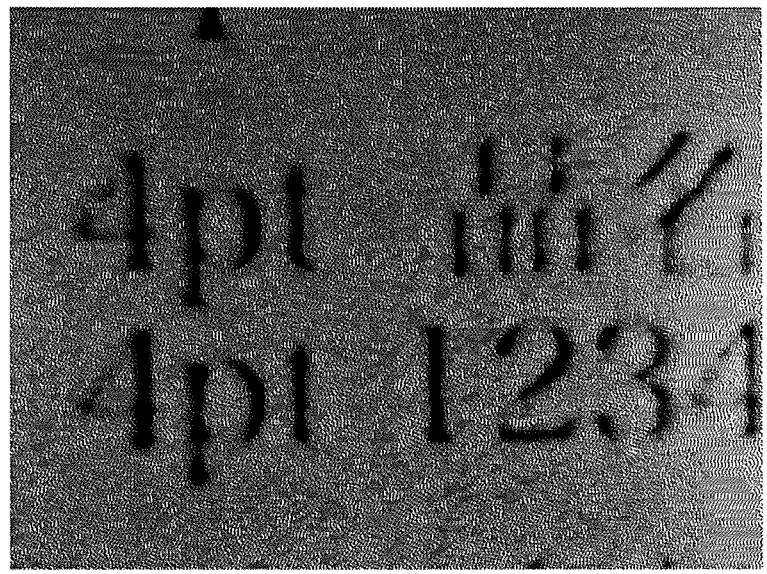
FIG. 22 is a diagram for describing an effect in the first embodiment.
Figure 23:
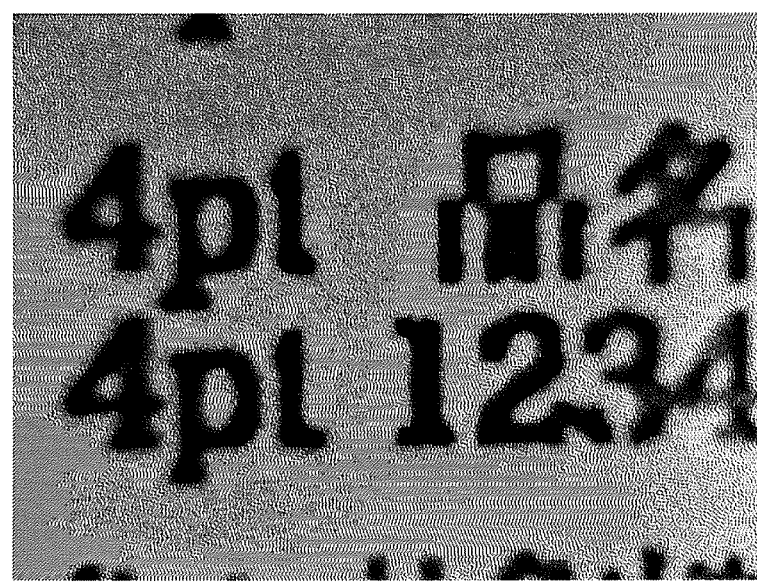
FIG. 23 is a diagram for describing an effect in the first embodiment.

Description is made below showing actual exemplary images. For example, when an aimed printing result includes a plurality of white characters such as those shown in FIG. 18, if an erosion process is simply performed on a white-plate graphic, then the white characters disappear as shown in FIG. 19. On the other hand, according to the present embodiment, a printing result such as that shown in FIG. 18 is obtained without the white characters disappearing. In addition, for example, when an aimed printing result includes a white graphic such as that shown in FIG. 20, if an erosion process is simply performed on a white-plate graphic, then a part of the white graphic disappears and gets thinner as shown in FIG. 21. On the other hand, according to the present embodiment, a printing result such as that shown in FIG. 20 is obtained without the white graphic disappearing or getting thinner. Furthermore, for example, when an aimed printing result includes a plurality of outline characters such as those shown in FIG. 22 (in FIG. 22, a white portion is a region where a white ink is to be applied), if an erosion process is simply performed on a white-plate graphic, then character portions get thicker as shown in FIG. 23. On the other hand, according to the present embodiment, a printing result such as that shown in FIG. 22 is obtained without the character portions getting thicker.

<1.5 Variants>

Variants of the above-described first embodiment will be described below. Note that the following first to third variants can also be similarly applied to a second embodiment which will be described later.

<1.5.1 First Variant>

In the first embodiment, a white-plate graphic erosion process is performed such that the shape of a white-plate graphic is made thinner. In other words, by the white-plate graphic erosion process, a white ink is not applied at all to pixels in a final erosion target region upon printing. However, the present invention is not limited thereto, and the amount of white ink applied to the pixels in the final erosion target region upon printing may be reduced over its original amount.

Regarding this, for example, it is assumed that each pixel can take any data value from 0 to 255 for each plate data, and the data value of a pixel to be applied with a white ink is set to 255 and the data value of a pixel not to be applied with a white ink is set to 0 for white-plate data. In such a case, in the present variant, the values of data of pixels in a final erosion target region among white-plate data are rewritten from "255" to, for example, "128" at the above-described step S140. By this, upon printing, a white ink of only one-half of the original amount of white ink applied is applied to the pixels in the final erosion target region. In this manner, a white-plate graphic can be thinned by 0.5 pixels in a pseudo manner.

<1.5.2 Second Variant>

In the first embodiment, an erosion process is performed such that a periphery of a white-plate graphic which is an erosion target is thinned by one pixel. However, the present invention is not limited thereto, and an erosion process may be performed such that the periphery of the white-plate graphic is thinned by two pixels or more.

Regarding this, for example, in a case where a white-plate graphic is thinned by two pixels by an erosion process, at the above-described step S110, a 5×5 erosion filter instead of a 3×3 erosion filter may be applied to each pixel, or after applying a 3×3 erosion filter to each pixel, a 3×3 erosion filter may be applied again to each pixel. Regarding such application of an erosion filter itself, known techniques can be adopted.

<1.5.3 Third Variant>

In the first embodiment, it is premised that printing is performed using normal process color inks and a white ink. However, the present invention can also be applied to a case in which printing is performed using an ink of a spot color (other than white) in addition to the above-described inks. For example, it is assumed that a gold ink in addition to normal process color inks and a white ink is used upon printing in a printing system (here, data of a plate for the gold ink is referred to as "G-plate data"). In this case, a region representing an OR between C-plate data, M-plate data, Y-plate data, K-plate data, and G-plate data is determined to be a colored region at the above-described step S120.

2. Second Embodiment

<2.1 Overview>

In the first embodiment, in order to thin a white-plate graphic without reducing the print quality of white characters and outline characters, a region having a color-plate graphic out of an erosion candidate region which is determined by applying an erosion filter to the white-plate graphic (i.e., a region of a set of pixels in which an ink(s) of a color (s) other than white is applied over a white ink) is determined to be a final erosion target region for the white-plate graphic. However, depending on print data, it may be desirable to remove pixels (out of an erosion candidate region) in which an ink(s) of a color (s) other than white is applied over a white ink, from a final erosion target region (i.e., not to thin a white-plate graphic), which will be described with reference to FIGS. 24 to 27.

Figure 24:
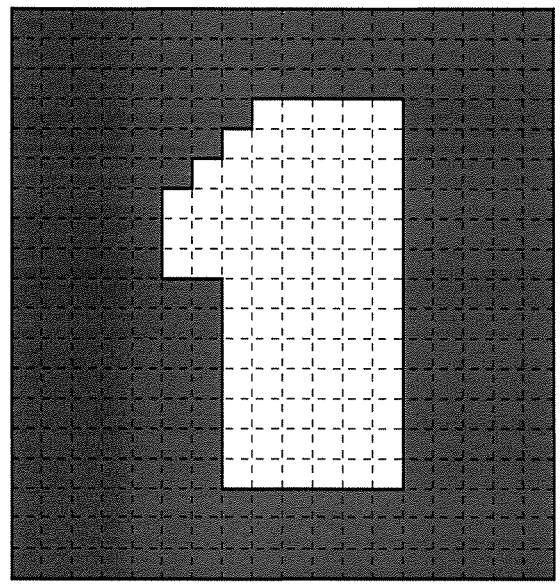
FIG. 24 is a diagram for describing an overview of a second embodiment of the present invention.
Figure 25:
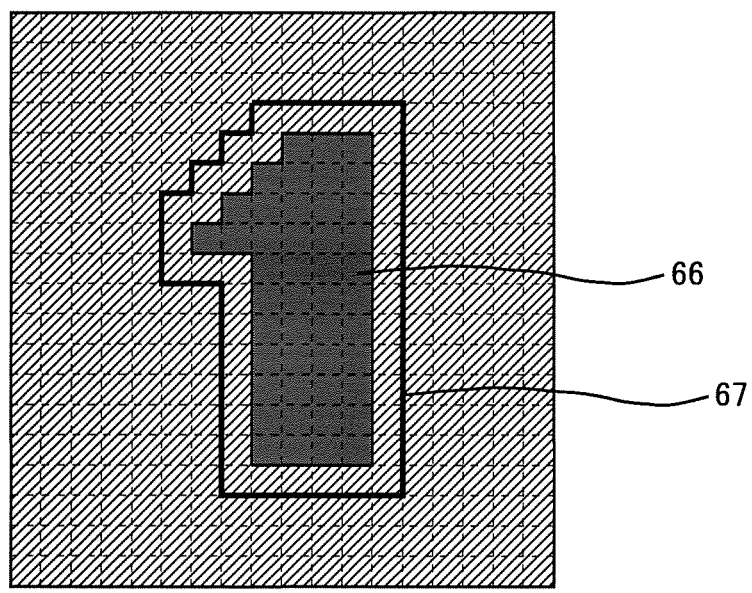
FIG. 25 is a diagram for describing the overview of the second embodiment.

FIG. 24 is a diagram schematically showing white-plate data, and FIG. 25 is a diagram schematically showing K-plate data. As for the white-plate data, a white portion in FIG. 24 is a region where a white ink is to be applied. In addition, as for the K-plate data, a region other than a shaded region indicated by reference sign 66 in FIG. 25 is a region where a black ink is to be applied. Note that a region within a bold frame indicated by reference sign 67 in FIG. 25 corresponds to the white portion (the region where a white ink is to be applied) in FIG. 24. Here, when the white-plate data and the K-plate data are stacked on top of each other, a white-plate graphic and a K-plate graphic overlap each other in a shaded region indicated by reference sign 69 in FIG. 26. The reason that the region in which the white-plate graphic and the K-plate graphic thus overlap each other is provided is to prevent the color of a base material (the color of an object to which the base material is attached in a case where the base material is transparent) from appearing even when plate misregistration occurs between a white plate and a K plate.

Figure 26:
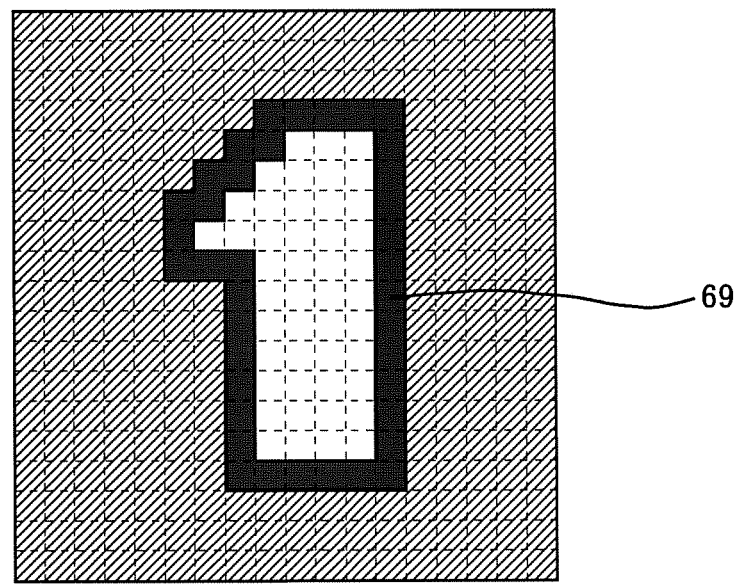
FIG. 26 is a diagram for describing the overview of the second embodiment.
Figure 27:
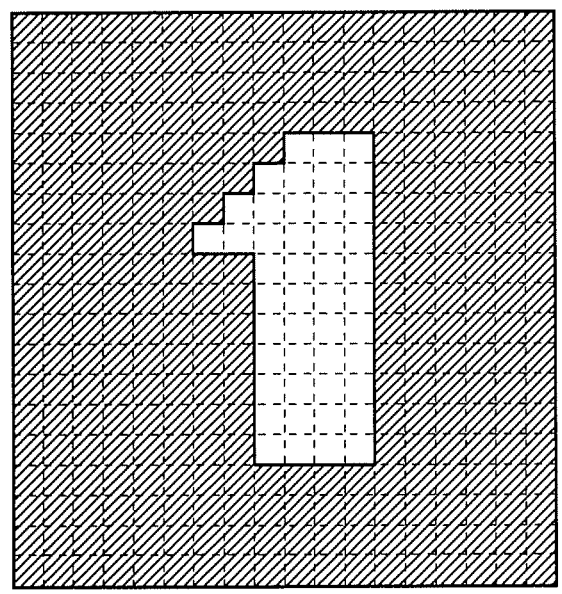
FIG. 27 is a diagram for describing the overview of the second embodiment.
Figure 28:
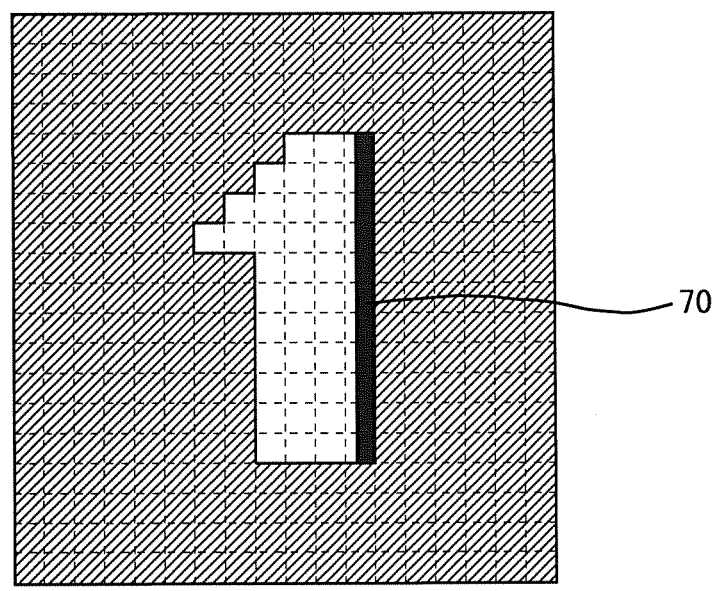
FIG. 28 is a diagram for describing the overview of the second embodiment.

If a white-plate graphic erosion process in the first embodiment is performed in such a case, then the shaded region 69 in FIG. 26 is determined to be a final erosion target region. Hence, by the white-plate graphic erosion process, as shown in FIG. 27, the region in which the white-plate graphic and the K-plate graphic overlap each other is no longer present. As a result, when plate misregistration occurs between the white plate and the K plate, for example, a portion in which the color of the base material appears on a surface such as a shaded portion indicated by reference sign 70 in FIG. 28 occurs.

In view of this, in the present embodiment, a white-plate graphic erosion process is performed in a procedure described below such that when a region in which a white-plate graphic and a color-plate graphic overlap each other (hereinafter, referred to as an "overlapping portion") is thus intentionally provided (in a case other than a case of using a white ink as a base), the white-plate graphic is not eroded at the overlapping portion. Note that the overall configuration of the system and the configuration of the print data processing apparatus in the present embodiment are the same as those of the first embodiment, and thus, description thereof is omitted (see FIGS. 1 and 2).

<2.2 Processing Procedure>

Figure 29:
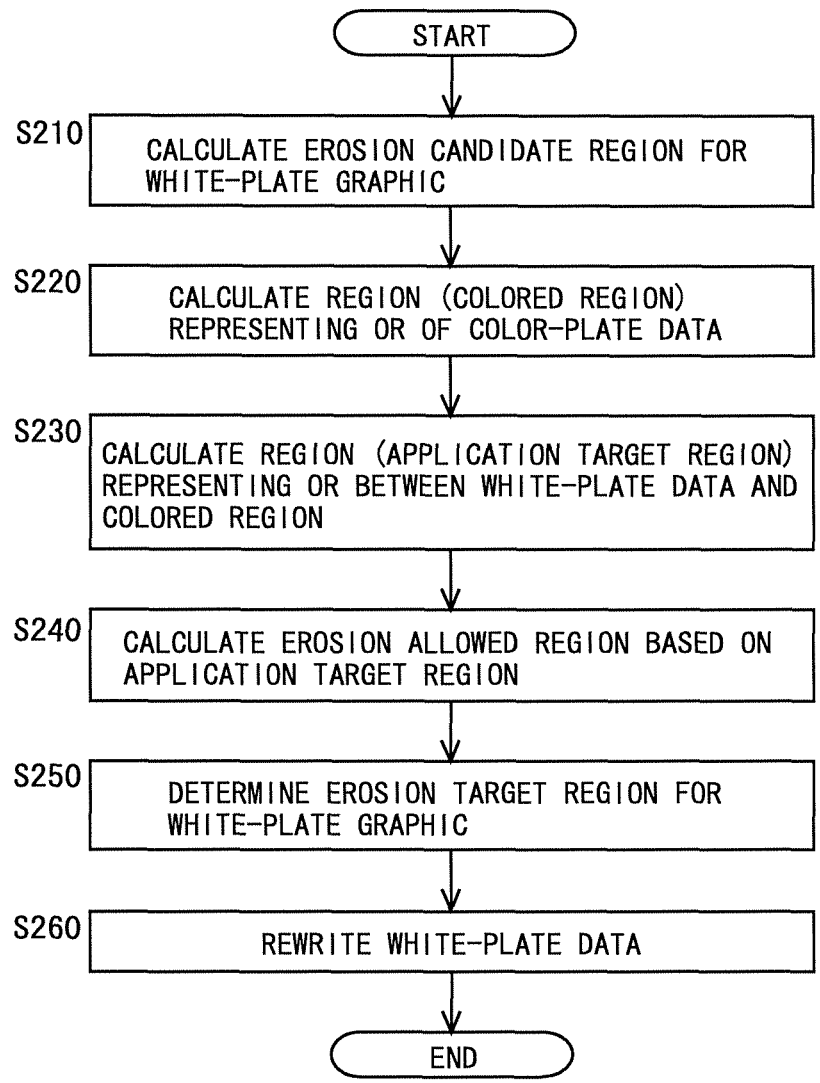
FIG. 29 is a flowchart showing a procedure of a white-plate graphic erosion process in the second embodiment.

FIG. 29 is a flowchart showing a procedure of a white-plate graphic erosion process in the present embodiment. Note that in the present embodiment, too, it is assumed that a RIP process is performed in advance on page data before performing a white-plate graphic erosion process.

At step S210 and S220, the same processes as those at step S110 and S120 (see FIG. 7) in the first embodiment are performed. Therefore, at a time point when step S220 ends, an erosion candidate region and a colored region have been determined.

Thereafter, a region representing an OR between white-plate data and the colored region (hereinafter, referred to as an "application target region") is determined (step S230). At this step S230, a region of a set of pixels included in at least one of a region to be applied with a white ink based on the white-plate data and the colored region is determined to be an application target region. In other words, a region of a set of pixels to be applied with an ink of at least any one color is determined to be an application target region.

Then, a region that allows for erosion of a white-plate graphic (hereinafter, referred to as an "erosion allowed region") out of the application target region determined at step S230 is determined (step S240). At this step S240, the erosion allowed region is determined by an erosion process in which a 3×3 erosion filter is applied to each pixel in the application target region, in the same manner as at step S110 in the first embodiment. That is, a region other than a region obtained after erosion by an erosion process out of a region (the application target region determined at step S230) obtained before erosion by the erosion process is determined to be an erosion allowed region.

Then, a final erosion target region for the white-plate graphic is determined (step S250). Specifically, a region representing an AND between the erosion candidate region determined at step S210, the colored region determined at step S220, and the erosion allowed region determined at step S240 (i.e., a region of a set of pixels included in all of the erosion candidate region, colored region, and erosion allowed region) is determined to be a final erosion target region.

Finally, a process of rewriting the white-plate data is performed on print data obtained by a RIP process (step S260). Specifically, the values of data of the pixels included in the final erosion target region among the white-plate data are rewritten to 0.

Note that in the present embodiment, an erosion candidate region calculating step is implemented by step S210, a colored-region calculating step is implemented by step S220, an application target region calculating step is implemented by step S230, an erosion allowed region calculating step is implemented by step S240, an erosion target region identifying step is implemented by step S250, and a white-plate data updating step is implemented by step S260. What processes are to be performed on various white-plate graphics will be described below using specific examples.

<2.2.1 Process for Data Having an Overlapping Portion>

First, what process is to be performed on data having an overlapping portion will be described. Here, a case in which print data includes white-plate data such as that shown in FIG. 24 and K-plate data such as that shown in FIG. 25 is focused on. Note that it is assumed that, as for color-plate data other than the K-plate data, all pixels have a data value of 0.

At the above-described step S210, the above-described 3×3 erosion filter is applied to each pixel represented by white in FIG. 24. As for the white-plate data, the pixels represented by white in FIG. 24 have a data value other than 0, and other pixels have a data value of 0. Therefore, by the erosion process, a region represented by white in FIG. 26 is obtained. As described above, since a region other than a region (here, the region represented by white in FIG. 26) obtained after erosion by an erosion process out of a region (here, the region represented by white in FIG. 24) obtained before erosion by the erosion process serves as an erosion candidate region, the shaded region 69 in FIG. 26 is determined to be an erosion candidate region. At the above-described step S220, based on the K-plate data, a region other than the shaded region 66 in FIG. 25 is determined to be a colored region.

Figure 30:
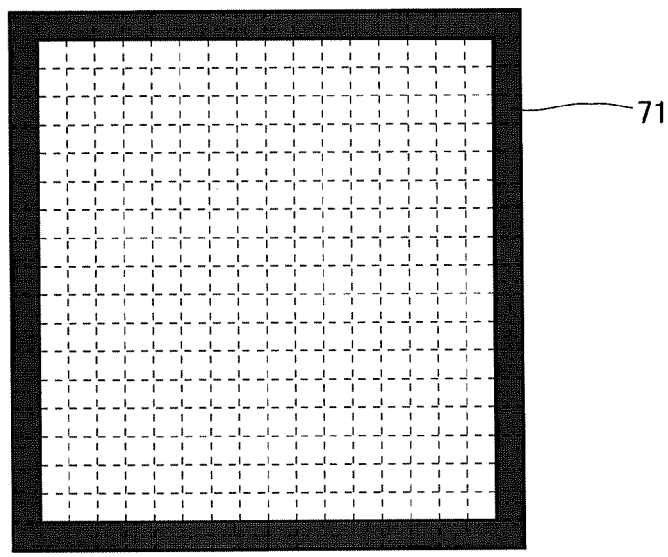
FIG. 30 is a diagram for describing a process for data having an overlapping portion in the second embodiment.
Figure 31:
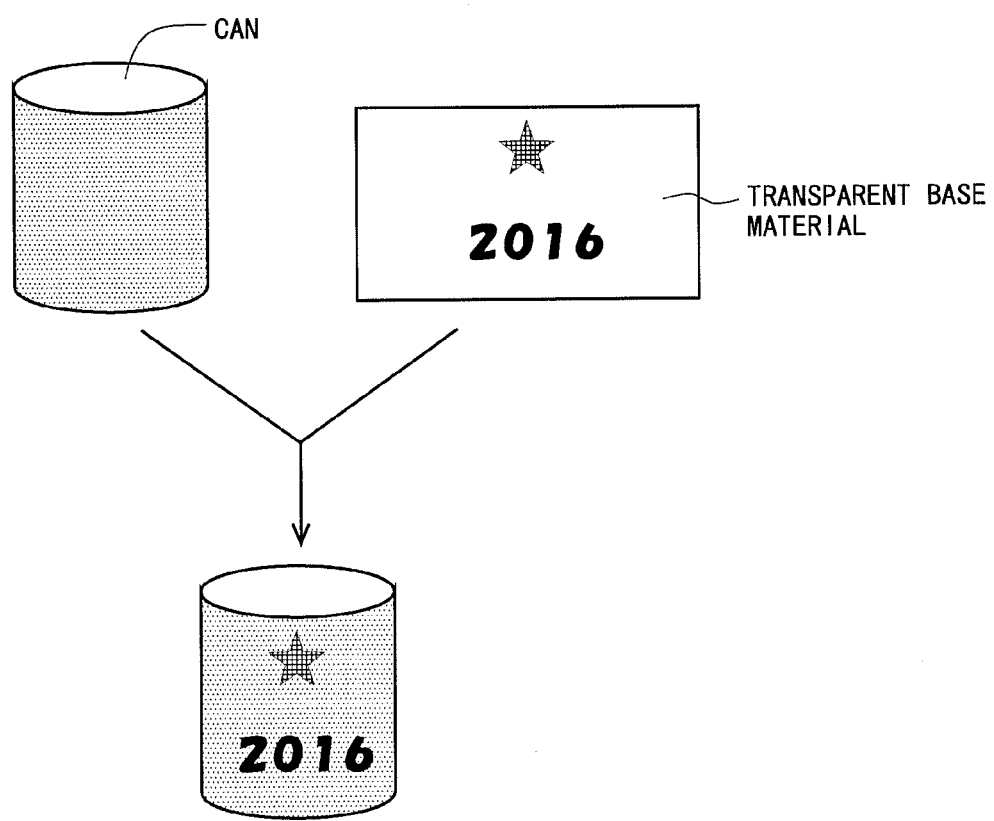
FIG. 31 is a diagram for describing printing performed on a transparent base material.

At the above-described step S230, based on the white-plate data and the colored region determined at step S220, the entire print region is determined to be an application target region. At step S240, the above-described 3×3 erosion filter is applied to each pixel included in the application target region (i.e., all pixels in the print region). By the erosion process using the 3×3 erosion filter, a region represented by white in FIG. 30 is obtained. As described above, since a region other than a region (here, the region represented by white in FIG. 30) obtained after erosion by an erosion process out of a region (here, the entire print region) obtained before erosion by the erosion process serves as an erosion allowed region, a shaded region indicated by reference sign 71 in FIG. 30 is determined to be an erosion allowed region. Note that here for convenience sake it is assumed that FIG. 30 shows pixels in the entire print region.

A final erosion target region is a region representing an AND between an erosion candidate region, a colored region, and an erosion allowed region. Since the erosion candidate region is the shaded region 69 in FIG. 26, the colored region is a region other than the shaded region 66 in FIG. 25, and the erosion allowed region is the shaded region 71 in FIG. 30, there is no final erosion target region.

By the above, erosion of a white-plate graphic is not performed on the above-described overlapping portion. Thus, upon printing, a black ink is applied over a white ink at the overlapping portion. Therefore, even when plate misregistration occurs between a white plate and a K plate, a desired printing result is obtained (the color of a base material does not appear) on the condition that the magnitude of the plate misregistration is within the width of the overlapping portion.

<2.2.2 Process for a Normal Graphic>

Next, what process is to be performed on a normal graphic will be described. Here, a case in which both a K-plate graphic and a white-plate graphic are the rectangular graphic indicated by reference sign 53 in FIG. 9 is focused on. Note that it is assumed that, as for color-plate data other than K-plate data, all pixels have a data value of 0.

At the above-described step S210, the above-described 3×3 erosion filter is applied to each pixel included in the rectangular graphic 53. As for white-plate data, pixels included in the rectangular graphic 53 have a data value other than 0, and pixels not included in the rectangular graphic 53 have a data value of 0. Therefore, by the erosion process, a region represented by the rectangular graphic 53s (see FIG. 9) is obtained. As described above, since a region other than a region (here, the region represented by the rectangular graphic 53s) obtained after erosion by an erosion process out of a region (here, the region represented by the rectangular graphic 53) obtained before erosion by the erosion process serves as an erosion candidate region, the shaded region 54 in FIG. 10 is determined to be an erosion candidate region. At the above-described step S220, based on the K-plate data, a region represented by the rectangular graphic 53, i.e., the shaded region 55 in FIG. 11, is determined to be a colored region.

At the above-described step S230, based on the white-plate data and the colored region determined at step S220, the same region (the shaded region 55 in FIG. 11) as the colored region is determined to be an application target region. At step S240, the above-described 3×3 erosion filter is applied to each pixel included in the application target region. By the erosion process using 3×3 erosion filter, a region represented by the rectangular graphic 53s (see FIG. 9) is obtained. As described above, since a region other than a region (here, the region represented by the rectangular graphic 53s of FIG. 9) obtained after erosion by an erosion process out of a region (here, the shaded region 55 of FIG. 11) obtained before erosion by the erosion process serves as an erosion allowed region, the same region (the shaded region 54 in FIG. 10) as the erosion candidate region is determined to be an erosion allowed region.

A final erosion target region is a region representing an AND between an erosion candidate region, a colored region, and an erosion allowed region. Since the erosion candidate region and the erosion allowed region are the shaded region 54 in FIG. 10 and the colored region is the shaded region 55 in FIG. 11, the final erosion target region is the shaded region 54 in FIG. 10.

By the above, upon printing, a white ink is not applied to pixels in the shaded region 54 in FIG. 10 among pixels (pixels included in the rectangular graphic 53 in FIG. 9) forming the white-plate graphic. By this, even when plate misregistration occurs between a white plate and a K plate, since a desired erosion process has been performed on the white-plate graphic, white streaks are suppressed from appearing around the black rectangular graphic formed based on the K-plate data.

<2.2.3 Process for a White Character>

Next, what process is to be performed on a white character will be described. Here, the white character shown in FIG. 3 is focused on. Note that it is assumed that, as for all color-plate data, all pixels have a data value of 0.

At the above-described step S210, the above-described 3×3 erosion filter is applied to each pixel represented by white in FIG. 3. As for white-plate data, the pixels represented by white in FIG. 3 have a data value other than 0, and pixels in a region shaded in FIG. 3 have a data value of 0. Therefore, by the erosion process, a region represented by white in FIG. 4 is obtained. As described above, since a region other than a region (here, the region represented by white in FIG. 4) obtained after erosion by an erosion process out of a region (here, the region represented by white in FIG. 3) obtained before erosion by the erosion process serves as an erosion candidate region, the shaded region 56 in FIG. 12 is determined to be an erosion candidate region. Since, all pixels have a data value of 0 regarding all color-plate data, there is no region (pixels) to be determined to be a colored region at the above-described step S220.

At the above-described step S230, based on the white-plate data, the region forming the white character shown in FIG. 3 is determined to be an application target region. At step S240, the above-described 3×3 erosion filter is applied to each pixel included in the application target region. By the erosion process using the 3×3 erosion filter, a region represented by white in FIG. 4 is obtained. As described above, since a region other than a region (here, the region represented by white in FIG. 4) obtained after erosion by an erosion process out of a region (here, the region represented by white in FIG. 3) obtained before erosion by the erosion process serves as an erosion allowed region, the same region (the shaded region 56 in FIG. 12) as the erosion candidate region is determined to be an erosion allowed region.

A final erosion target region is a region representing an AND between an erosion candidate region, a colored region, and an erosion allowed region. Since the erosion candidate region and the erosion allowed region are the shaded region 56 in FIG. 12 and there is no region determined to be a colored region, there is no final erosion target region.

By the above, erosion is not performed on the white character shown in FIG. 3. Therefore, the white character is printed at a desired thickness. Note that when, as in this example, the data values of all pixels for all color-plate data are 0, there is no region (pixels) to be determined to be a colored region, and thus, there is no final erosion target region regardless of an erosion allowed region. Therefore, after step S220 ends, this white-plate graphic erosion process may be terminated without performing the processes at step S230 to S260.

<2.2.4 Process for an Outline Character>

Next, what process is to be performed on an outline character will be described. Here, the outline character shown in FIG. 5 is focused on. Note that it is assumed that, as for all color-plate data, all pixels have a data value of 0.

At the above-described step S210, the above-described 3×3 erosion filter is applied to each pixel represented by white in FIG. 5. As for white-plate data, the pixels represented by white in FIG. 5 have a data value other than 0, and pixels in a region shaded in FIG. 5 have a data value of 0. Therefore, by the erosion process, a region represented by white in FIG. 6 is obtained. As described above, since a region other than a region (here, the region represented by white in FIG. 6) obtained after erosion by an erosion process out of a region (here, the region represented by white in FIG. 5) obtained before erosion by the erosion process serves as an erosion candidate region, the shaded regions 57 in FIG. 13 are determined to be erosion candidate regions. Since, all pixels have a data value of 0 regarding all color-plate data, there is no region (pixels) to be determined to be a colored region at the above-described step S220.

At the above-described step S230, based on the white-plate data, the region represented by white in FIG. 5 is determined to be an application target region. At step S240, the above-described 3×3 erosion filter is applied to each pixel included in the application target region. By the erosion process using the 3×3 erosion filter, a region represented by white in FIG. 6 is obtained. As described above, since a region other than a region (here, the region represented by white in FIG. 6) obtained after erosion by an erosion process out of a region (here, the region represented by white in FIG. 5) obtained before erosion by the erosion process serves as an erosion allowed region, the same regions (the shaded regions 57 in FIG. 13) as the erosion candidate regions are determined to be erosion allowed regions.

A final erosion target region is a region representing an AND between an erosion candidate region, a colored region, and an erosion allowed region. Since the erosion candidate regions and the erosion allowed regions are the shaded regions 57 in FIG. 13 and there is no region determined to be a colored region, there is no final erosion target region.

By the above, erosion is not performed on the outline character shown in FIG. 5. Therefore, the outline character is printed at a desired thickness. Note that in this example, too, as with the process for a white character, after step S220 ends, this white-plate graphic erosion process may be terminated without performing the processes at step S230 to S260.

<2.2.5 Others>

As in the case in which a normal graphic, a white character, and an outline character are mixed as appropriate in the first embodiment, in the present embodiment, a white-plate graphic erosion process is performed without reducing print quality also in a case where a normal graphic, a white character, an outline character, and a graphic (data) having an overlapping portion are mixed as appropriate.

<2.3 Effects>

According to the present embodiment, as in the first embodiment, a white-plate graphic erosion process is performed on raster data. Hence, a white-plate graphic erosion process can be performed at a high speed. In addition, as in the first embodiment, a pixel in which a process color ink(s) is not applied over a white ink does not serve as an erosion target. Hence, a reduction in the print quality regarding white characters and outline characters is prevented. Furthermore, according to the present embodiment, when an overlapping portion that takes into account plate misregistration between a white plate and a color plate is provided, pixels included in the overlapping portion do not serve as erosion targets. Hence, a reduction in print quality due to plate misregistration is suppressed. By the above, even when print data includes various data as white-plate data, a white-plate graphic erosion process can be performed at a high speed while sufficient print quality is ensured.

Although the present invention has been described in detail above, the above description is to be considered in all respects as illustrative and not restrictive. It will be understood that many other changes and modifications may be made without departing from the sprit and scope of the present invention.

Note that this application claims priority to Japanese Patent Application No. 2016-143128 titled "Print Data Processing Method, Print Data Processing Apparatus, and Print Data Processing Program" filed Jul. 21, 2016, the content of which is incorporated herein by reference.

What is claimed is:

1. A print data processing method for processing print data, the print data being raster data including white-plate data representing a white-plate graphic corresponding to a region to be applied with a white ink; and color-plate data representing a color-plate graphic corresponding to a region to be applied with an ink of a color other than white, the method comprising:
an erosion candidate region calculating step of determining an erosion candidate region, the erosion candidate region being a candidate for a region in which the white-plate graphic represented by the white-plate data is eroded;
a colored-region calculating step of determining a colored region based on the color-plate data, the colored region being the region to be applied with an ink of a color other than white;
an application target region calculating step of determining, as an application target region, a region of a set of pixels included in at least one of the colored region and the region to be applied with a white ink based on the white-plate data;
an erosion allowed region calculating step of determining an erosion allowed region by performing an erosion process on the application target region, the erosion allowed region being a region allowing for erosion of the white-plate graphic represented by the white-plate data;
an erosion target region identifying step of defining a region of a set of pixels included in all of the erosion candidate region, the colored region, and the erosion allowed region as an erosion target region; and
a white-plate data updating step of rewriting values of data of the pixels included in the erosion target region among the white-plate data such that an amount of white ink applied to the pixels is reduced.

2. The print data processing method according to claim 1, wherein in the erosion allowed region calculating step, a region other than a region obtained after erosion by the erosion process out of the application target region is determined to be the erosion allowed region.

3. The print data processing method according to claim 2, wherein in the erosion allowed region calculating step, as the erosion process, an erosion process using a filter is performed on the application target region.

4. The print data processing method according to claim 1, wherein in the white-plate data updating step, the values of data of the pixels included in the erosion target region among the white-plate data are rewritten such that a white ink is not applied to the erosion target region.

5. The print data processing method according to claim 1, wherein in the white-plate data updating step, the values of data of the pixels included in the erosion target region among the white-plate data are rewritten such that an amount of white ink applied to the pixels included in the erosion target region is smaller than an amount of white ink applied to pixels included in a region other than the erosion target region out of the region to be applied with a white ink.

6. The print data processing method according to claim 1, wherein in the erosion candidate region calculating step, an erosion process using a filter is performed on the region to be applied with a white ink based on the white-plate data, and a region other than a region obtained after erosion by the erosion process out of the region obtained before erosion by the erosion process is determined to be the erosion candidate region.

7. A print data processing method for processing print data, the print data being raster data including white-plate data representing a white-plate graphic corresponding to a region to be applied with a white ink; and color-plate data representing a color-plate graphic corresponding to a region to be applied with an ink of a color other than white, the method comprising:
an erosion candidate region calculating step of determining an erosion candidate region, the erosion candidate region being a candidate for a region in which the white-plate graphic represented by the white-plate data is eroded;
a colored-region calculating step of determining a colored region based on the color-plate data, the colored region being the region to be applied with an ink of a color other than white;
an erosion target region identifying step of defining a region of a set of pixels included in both the erosion candidate region and the colored region as an erosion target region; and
a white-plate data updating step of rewriting values of data of the pixels included in the erosion target region among the white-plate data such that an amount of white ink applied to the pixels is reduced.

8. A print data processing apparatus that processes print data, the print data being raster data including white-plate data representing a white-plate graphic corresponding to a region to be applied with a white ink; and color-plate data representing a color-plate graphic corresponding to a region to be applied with an ink of a color other than white, the apparatus comprising:
an erosion candidate region calculating unit configured to determine an erosion candidate region, the erosion candidate region being a candidate for a region in which the white-plate graphic represented by the white-plate data is eroded;
a colored-region calculating unit configured to determine a colored region based on the color-plate data, the colored region being the region to be applied with an ink of a color other than white;
an application target region calculating unit configured to determine, as an application target region, a region of a set of pixels included in at least one of the colored region and the region to be applied with a white ink based on the white-plate data;
an erosion allowed region calculating unit configured to determine an erosion allowed region by performing an erosion process on the application target region, the erosion allowed region being a region allowing for erosion of the white-plate graphic represented by the white-plate data;
an erosion target region identifying unit configured to define a region of a set of pixels included in all of the erosion candidate region, the colored region, and the erosion allowed region as an erosion target region; and
a white-plate data updating unit configured to rewrite values of data of the pixels included in the erosion target region among the white-plate data such that an amount of white ink applied to the pixels is reduced.

* * * * *